United States Patent
DiLoreto, Jr. et al.

[11] Patent Number: 6,149,803
[45] Date of Patent: Nov. 21, 2000

[54] STORM SEWER CATCH BASIN FILTER

[75] Inventors: Rinaldo J. DiLoreto, Jr.; Sean C. Simonpietri, both of Richmond, Va.

[73] Assignee: Atlantic Contruction Fabrics, Inc., Richmond, Va.

[21] Appl. No.: 09/143,104

[22] Filed: Aug. 28, 1998

[51] Int. Cl.[7] .............................. B01D 29/27; E03F 5/06
[52] U.S. Cl. .................. 210/164; 210/237; 210/489; 210/497.01; 210/170
[58] Field of Search .................................. 210/163–166, 210/237, 249, 445, 170, 451–453, 459, 463, 484, 488, 489, 497.01; 248/94, 99, 101; 4/289–291; 404/2, 4, 5

[56] References Cited

U.S. PATENT DOCUMENTS

| | | |
|---|---|---|
| 989,473 | 4/1911 | Andersen . |
| 1,413,892 | 4/1922 | Bergholz et al. . |
| 1,728,381 | 9/1929 | Waters . |
| 2,102,310 | 12/1937 | Egan . |
| 2,384,057 | 9/1945 | Wetherell . |
| 2,414,487 | 1/1947 | Schuttler . |
| 2,658,625 | 11/1953 | Rafferty . |
| 3,713,539 | 1/1973 | Thompson et al. . |
| 4,268,390 | 5/1981 | Cunningham . |
| 4,321,713 | 3/1982 | Thompson . |
| 4,419,232 | 12/1983 | Arntyr et al. . |
| 4,448,686 | 5/1984 | Friedman ................................ 210/238 |
| 4,839,047 | 6/1989 | Shishkin et al. ........................ 210/356 |
| 4,919,568 | 4/1990 | Hurley . |
| 4,925,550 | 5/1990 | Shishkin et al. ........................ 210/106 |
| 5,039,248 | 8/1991 | Bowman . |
| 5,213,438 | 5/1993 | Barenwald . |
| 5,284,580 | 2/1994 | Shyh ...................................... 210/163 |
| 5,372,714 | 12/1994 | Logue, Jr. . |
| 5,397,464 | 3/1995 | Hannon . |
| 5,575,925 | 11/1996 | Logue, Jr. . |
| 5,720,574 | 2/1998 | Barella . |
| 5,934,820 | 8/1999 | Hinkle . |
| 5,958,226 | 9/1999 | Fleischmann . |
| 5,985,157 | 11/1999 | Leckner et al. . |
| 6,045,691 | 4/2000 | McDermott . |

FOREIGN PATENT DOCUMENTS

| | | |
|---|---|---|
| 10-338908 | 12/1998 | Japan . |
| 11-057693 | 3/1999 | Japan . |

Primary Examiner—David A. Simmons
Assistant Examiner—Fred Prince
Attorney, Agent, or Firm—Armstrong, Westerman, Hattori, McLeland & Naughton

[57] ABSTRACT

A storm sewer catch basin filter includes a frame having a plurality of radially extending arms, each arm having an end. The catch basin filter further includes an edge piece fixed to the end of each of the arms and be engageable with a lip in a storm sewer catch basin. Furthermore, the catch basin filter includes a filter bag, supported from the edge pieces, and wherein the filter bag has an open top for receiving water entering the storm sewer catch basin, so that the water is filtered as it passes through the filter bag.

23 Claims, 10 Drawing Sheets

STORM SEWER CATCH BASIN FILTER

BACKGROUND OF THE INVENTION

1. Field of the Invention

This invention relates to a filter for use in a storm sewer catch basin. More specifically, the instant invention relates to a filter bag for use in a storm sewer catch basin in which the filter bag and the structure supporting it remains below grade level.

2. Description of the Prior Art

Run off water from rains and the melting of snow is primarily handled by storm sewer systems in most cities. Such storm sewer systems are designed to handle a large quantity of water flowing through them in a short amount of time. In such storm sewer systems, the run off water flows into a grating which is located at grade level, or at the street level, and into a catch basin. The water then flows from the catch basin into an underground storm sewer line.

Often at construction sites, and in many other circumstances where the run off water contains silt or other solid materials and debris, the storm sewer may easily get clogged with silt or other debris. Thus, in order to prevent the water entering the storm sewer line from containing silt or other particulate matter, catch basin filters have been used which include a filter bag suspended from the grating on top of the catch basin. Such a device may be found in U.S. Pat. Nos. 5,372,714 and 5,575,925. In the apparatuses used in the above-mentioned patents, the removable filter bag is supported below grade level in the catch basin and has looped flaps which extend above the grade level. The filter bag is held in place in the basin by the heavy grate which rests on the flaps. The flaps extend above grade level and away from the grate. When the filter bag is to be removed, bars are inserted along the flaps which extend above grade level. Then the filter is lifted by the inserted bars and removed for dumping. This device is illustrated in FIG. 10.

A problem with the above filter arrangement is that in cities located in colder climates, in which snow plows are often needed to clear the streets of snow and ice, the looped flaps which extend above the grate can easily be damaged by such road clearing equipment. Accordingly, there is a need for a catch basin filter which is completely below grade level, in other words, in which not even looped flaps extend above the catch basin grating.

SUMMARY OF THE INVENTION

Accordingly, the instant invention overcomes the above described deficiency. More specifically, the instant invention provides for a catch basin filter to filter silt and other particulates out of water entering the catch basin, in which the catch basin filter is completely located below grade. There are no looped flaps or any other parts of the filter which extend above the catch basin grating and thus above grade.

The instant invention provides for a storm sewer catch basin filter having a frame, and at least an edge piece fixed to the frame wherein the edge piece is cooperatively engageable with a lip of a storm sewer catch basin. Furthermore, a filter bag, supported from the edge piece, has an open top for receiving water entering the storm sewer catch basin, wherein the water is thus filtered as is passes through the filter bag. While it is contemplated that the frame may be a type of perimeter frame, preferably the frame includes a plurality of radially extending arms, wherein each arm has an end, and further wherein a plurality of edge pieces are provided such that one edge piece is fixed to the end of each arm. Preferably, the frame includes four radially extending arms formed by two cross-bars connected at a generally center point of each cross-bar.

It is advantageous to note that the frame and the filter bag may take many different forms. For example, the frame may be fabricated to fit a square or rectangular opening or may be fabricated to fit a circular opening. Of course, the filter bag may also be appropriately tailored to the opening, whether it be rectangular, square or round. The frame may also be tailored for a curb inlet in which one of the four sides of the frame does not rest on the grating support.

The catch basin filter, in accordance with the instant invention, also includes a dump strap to assist in dumping the silt from the filled catch basin filter. The beneficial structure, as described above, enables a catch basin filter to be installed in a normal storm sewer catch basin, completely below grade, thus preventing any damage from snow plows and the like. The frame of the catch basin filter in accordance with the instant invention also assists in allowing easy dumping of the silt therefrom.

DETAILED DESCRIPTION OF THE INVENTION

Figure 1:
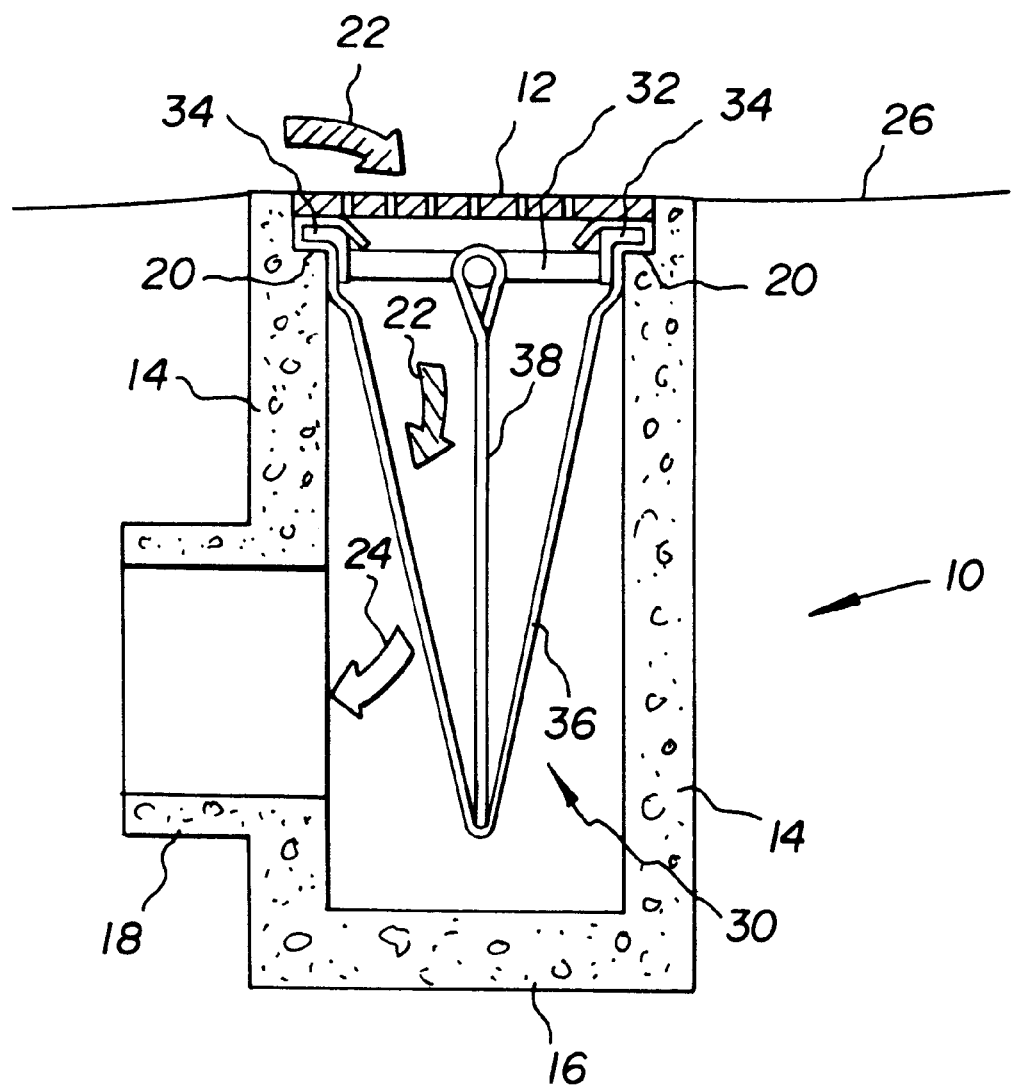
FIG. 1 is a cross-sectional view of the catch basin filter installed in the catch basin in accordance with the instant invention.
Figure 2:
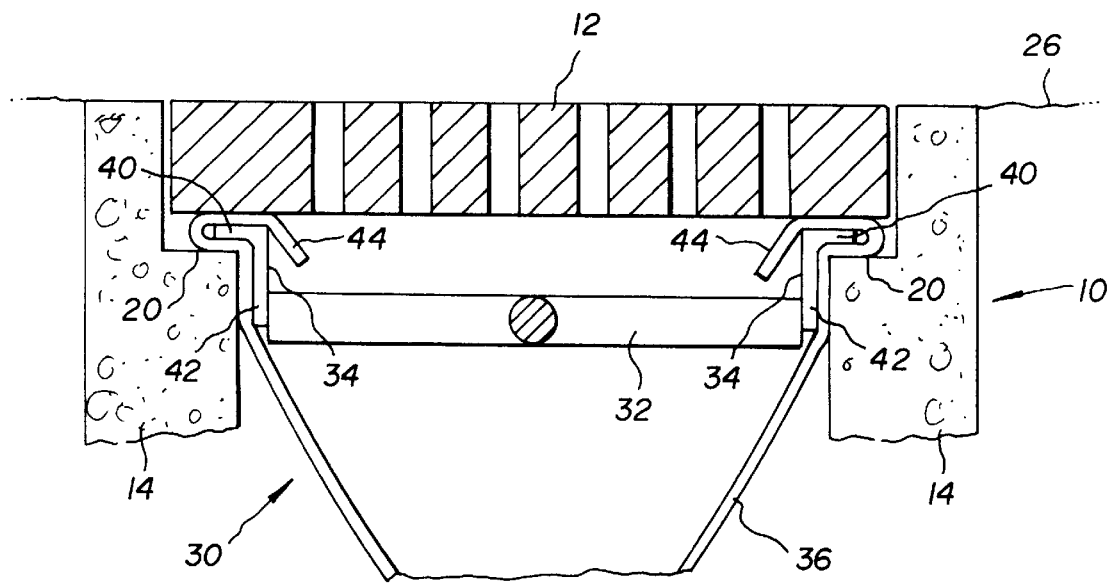
FIG. 2 is an illustration of the upper portion of the frame and filter bag of the catch basin filter in accordance with the instant invention, with the catch basin grating on top thereof.

FIG. 1 illustrates a cross-sectional view of a storm sewer catch basin filter in accordance with the instant invention. FIG. 2 is a partial cross-sectional view of the upper portion of the catch basin filter positioned underneath of the catch basin inlet grate. Specifically, as seen in FIGS. 1 and 2, a storm sewer catch basin is indicated generally by arrow 10.

The catch basin has an inlet grate 12, side walls 14 and bottom 16. Underground sewer line 18 is open into the catch basin 10 through one of side walls 14. Furthermore, near the top of catch basin 10, inlet grate support ledges 20 provide for a surface on which the inlet grate 12 normally sits. The grade level or ground level 26 is illustrated as being even with the top of inlet grate 12 and the top of catch basin 10.

The catch basin filter, indicated by arrow 30, includes frame 32, edge pieces 34 and filter bag 36. Filter bag 36 also includes one or more dump straps 38 which are secured to the bottom of filter bag 36 and extend upwardly into the interior thereof. In FIG. 1, dump strap 38 is secured at an upper portion thereof around a portion of frame 32. Arrows 22 indicate the run off water entering catch basin 10 through inlet grate 12 and flowing into filter bag 36. This run off water, indicated by arrows 22, contains silt, or other particulate matter and debris. Arrow 24 indicates the filtered water exiting from filter bag 36 and into underground storm sewer line 18. The silt and/or particulate matter remain in filter bag 36 until the bag is removed from the catch basin and the silt and/or particulate matter is dumped from the filter bag 36.

FIG. 2 illustrates an enlarged cross-sectional view of the upper portion of the catch basin 10 and the catch basin filter 30. Specifically, with the catch basin filter 30 in place, the support ledges 20 now provide support for edge pieces 34 attached to the outer ends of frame 32. In FIG. 2, edge pieces 34 have substantially an angle shape, although they may also be formed in a flat or any other shape which will appropriately rest on ledge 20 and be connectable to frame 32. As seen in FIG. 2, each edge piece 34 includes a top portion 40 and a bottom portion 42. Top portion 40 is generally flat for being supported by ledge 20, and bottom portion 42 extends downwardly from the top portion 40 and is in a generally vertical orientation. In FIG. 2, bottom portion 42 of edge piece 34 is fixed directly to the end of an arm of frame 32.

The filter material of filter bag 36 may be formed of a woven material which allows the passing of water or other type of liquid while filtering out particulate matter. A flap 44 of bag 36 extends around the outer portion of each edge piece 34. Specifically, flap 44 extends from the outside of edge piece 34, over the top of the edge and back down into the interior of filter bag 36. The inlet grate 12 of the catch basin rests upon the top of the filter bag flaps 44 and the generally flat top portion 40 of edge pieces 34. Because all pieces of filter bag 36, frame 34 and edge pieces 34 remain below inlet grate 12, there are no portions of the catch basin filter 30 which extend above grade level. Because of this, there are no problems when snow plows or other types of road equipment are operating along roads containing such storm sewer catch basins using the catch basin filter 30.

Figure 3A:
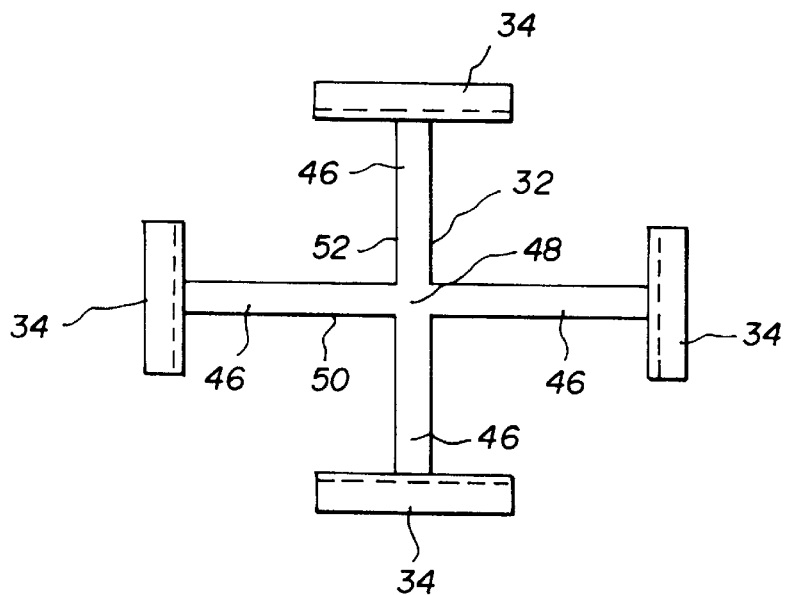
FIG. 3A is a plan view of one version of the frame in accordance with the instant invention.
Figure 3B:
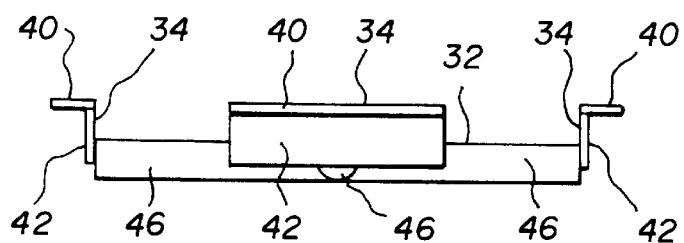
FIG. 3B is an elevational view of the frame of FIG. 3A.

FIGS. 3A and 3B illustrate one version of the frame 32 with edge pieces 34. Frame 32 comprises radially extending engagement arms 46. Edge pieces 34 are fixed to a remote end of each engagement arm 46. As seen in FIG. 3A, edge pieces 34 are generally straight and are disposed perpendicular to the arm to which it is attached, and in a generally horizontal orientation. Also, as can be seen in FIG. 3A, the four radially extending arms are formed of two cross-bars 50, 52 which are connected together at a center point 48 of each cross-bar. As also seen in FIG. 3B, the edge pieces 34 are angle shaped, having a generally flat top portion 40 and a generally vertical bottom portion 42, extending downwardly from the top portion 40. The top portions 40 are formed so as to fit on top of support ledges 20 shown in FIGS. 1 and 2. Extending arms 46 of frame 32 are fixed to bottom portions 42 of the edge pieces 34.

In FIG. 3A, cross-bars 50 and 52 can be seen which are connected to one another at the center points 48 of each cross-bar. In FIG. 3A, it can be seen that cross-bar 50 is longer than cross-bar 52. Accordingly, the frame 32 of FIGS. 3A and 3B is adapted for use in a rectangular storm sewer catch basin. Of course, the catch basin filter 30 and frame 32 may be used in many shapes of catch basins. For example, a square catch basin may easily used the catch basin filter 30 of the instant invention by simply using cross bars of equal length. Furthermore, the instant invention may be used with a circular catch basin or even a catch basin with a curb inlet.

Figure 3C:
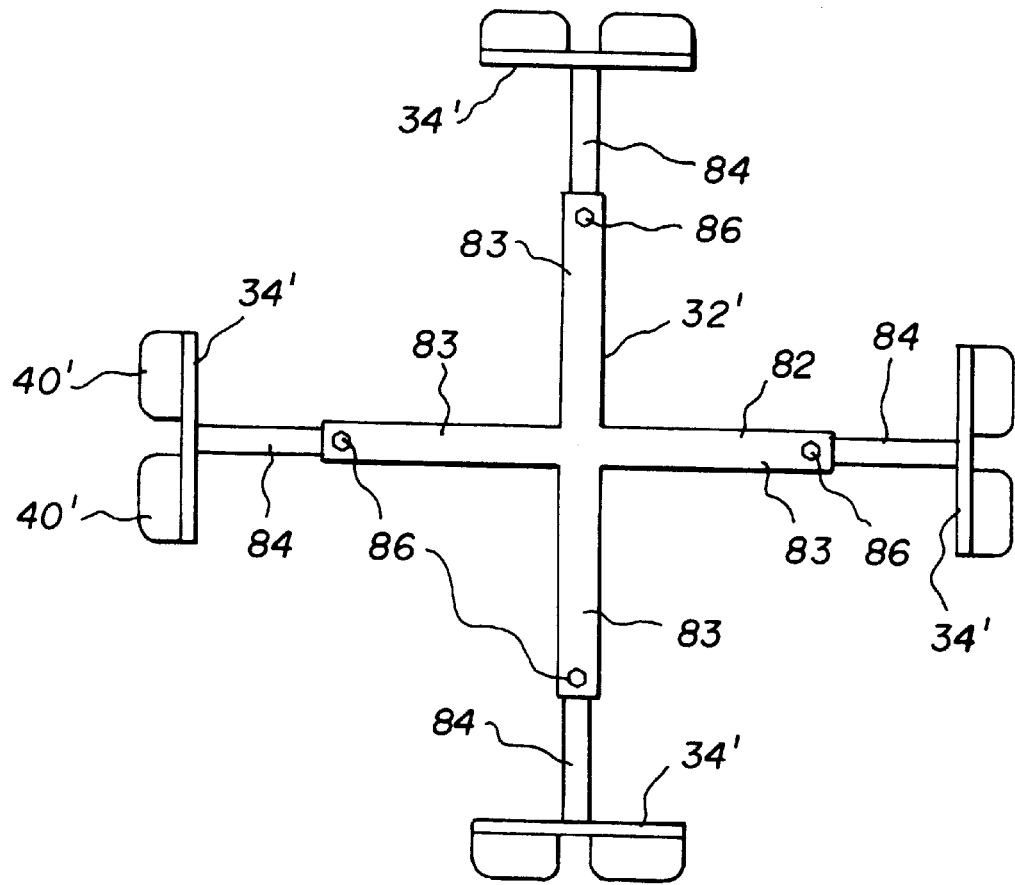
FIG. 3C is a view of the frame similar to FIGS. 3A and 3B, with adjustable arms.

FIG. 3C illustrates an adjustable version of frame 32 of FIGS. 3A and 3B. In FIG. 3C, adjustable frame 32' includes a base frame member 82 having arms 83 extending outwardly from a center point. Arms 83 are preferably formed of hollow tubing. Each arm 83 accepts an extension arms 84 therein, such that extension arm 84 is slidable with respect to arm 83, in order to be adjustable. A locking mechanism is provided by a bolt 86 located on an outer portion of each arm 83. As bolt 86 is tightened, extension arm 84 is fixed with respect to arm 83. Of course, any other type of extension, such as a screw type or a locking mechanism, such a pin may be used with adjustable frame 32'.

As seen in FIG. 3C, frame 32' is viewed from the underside thereof. The lock mechanism may be located at any appropriate location. An edge piece 34' is located on an outer end of each extension arm 84. As illustrated in FIG. 3C, each edge piece 34' has a two-section top portion 40'. Of course, each edge piece 34' of FIG. 3C could also employ a single-section top portion 40 as shown in FIGS. 3A and 3B.

With the adjustable frame 32', as illustrated in FIG. 3C, frame 32' may be adjusted to fit different sizes of filter bags and different sizes of storm sewer catch basins.

Figure 4A:
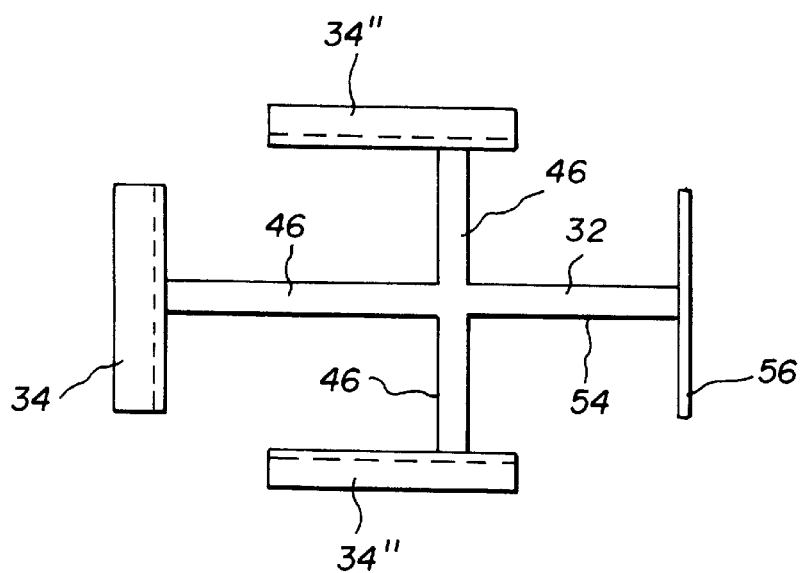
FIG. 4A is a plan view of another version of the frame according to the instant invention, for use with a catch basin with a curved inlet.
Figure 4B:
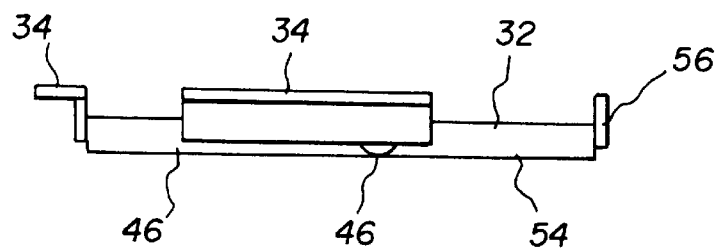
FIG. 4B is an elevational view of the frame of FIG. 4A.

FIGS. 4A and 4B illustrate a frame 32 for a catch basin with a curb inlet. The element of FIGS. 4A and 4B, where similar to those in FIGS. 3A and 3B, will carry the same reference numerals. FIGS. 4A and 4B show the frame 32 having radially extending engagement arms 46, with edge pieces 34 and 34" fixed to the end of engagement arms 46. Additionally, a radially extending support arm 54 is provided with an edge support 56 fixed on the end thereof. Opposing edge pieces 34", attached to engagement arms 46, are offset slightly from the version shown in FIGS. 3A and 3B. In other words, in FIGS. 3A and 3B, all of the edge pieces 34 are attached to the corresponding engagement arms 46 at a point substantially at the mid-point of each edge piece 34. In FIGS. 4A and 4B, the opposing edge pieces 34" are offset toward the end edge piece 34. The radially extending support arm 54 and the edge support 56 are located at the end of the catch basin filter 30 which is nearest to the curb inlet. Because of the curb inlet, there may be no support ledge 20 on this side of the catch basin. Accordingly, edge support 56 is provided to support the filter bag without bearing on a support ledge.

Figure 5A:
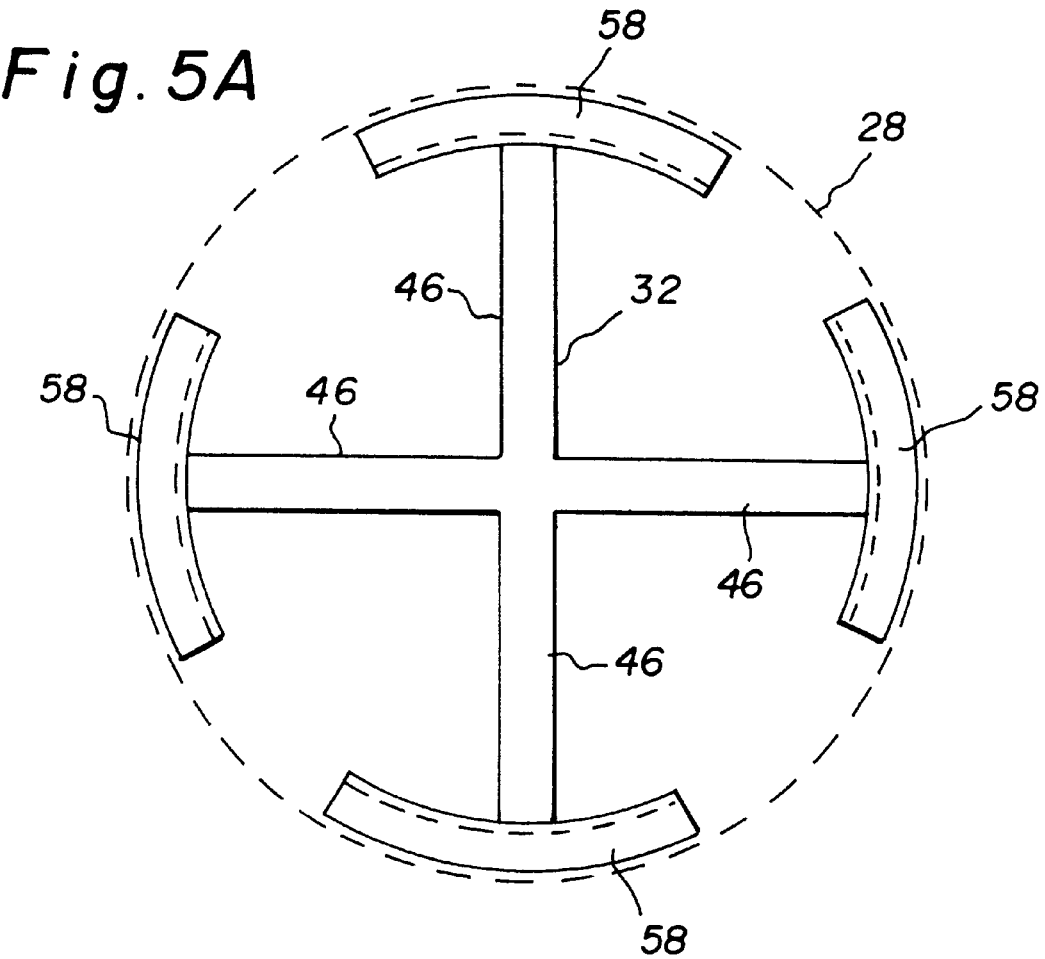
FIG. 5A is a plan view of another version of the frame according to the instant invention, which is to be used with a circular catch basin.
Figure 5B:
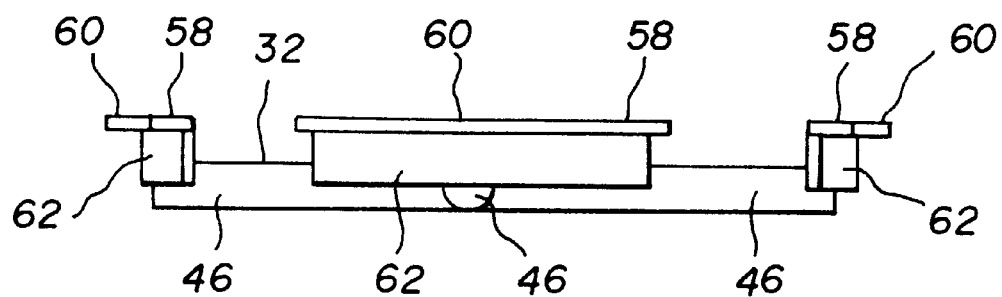
FIG. 5B is an elevational view of the frame of FIG. 5A.

Elements in FIGS. 5A and 5B which are similar to those of FIGS. 4A and 4B and FIGS. 3A and 3B will have the same reference numeral as those figures. FIGS. 5A and 5B illustrate a plan view and an elevational view, respectively, of a frame 32 and curved edge pieces 58. The frame 32 and curved edge pieces 58 of FIGS. 5A and 5B are for use with a circular catch basin. Specifically, curved edge pieces 58 have a curved top portion 60 and curved bottom portion 62 extending downwardly from the top portion 60. Curved edge pieces 58 are fixed to the outer end of engagement arms 46 of frame 32. A circular filter bag, indicated as reference numeral 28, would be supported by the structure of frame 32 and curved edge pieces 58.

Figure 6:
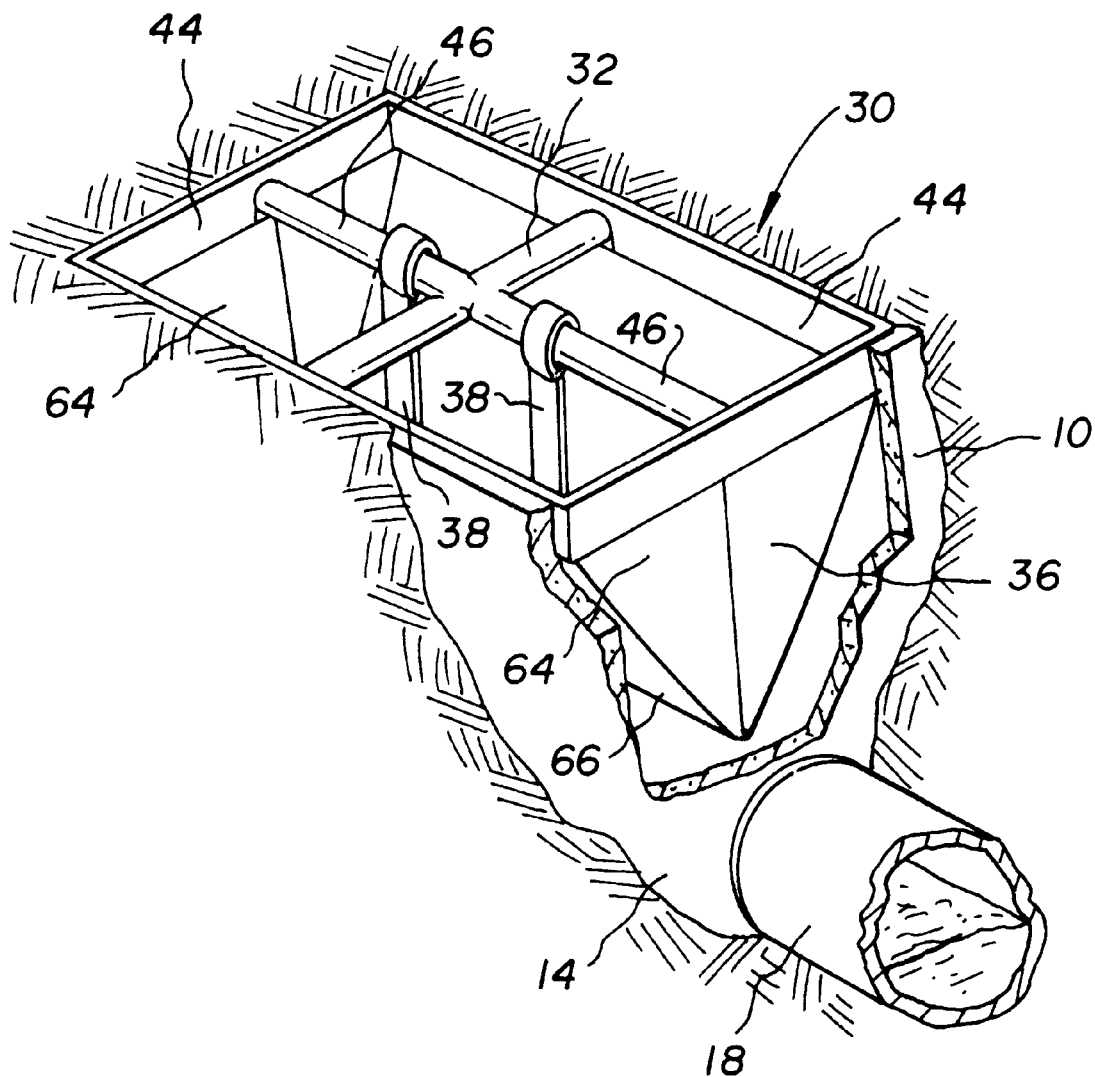
FIG. 6 is a perspective, cut-away view of the catch basin filter according to the instant invention, installed in a catch basin.

FIG. 6 illustrates a partial cut-away, perspective view of the catch basin filter 30 in place. In FIG. 6, the inlet grate 12 is not shown. The frame 32 is shown with dump straps 38, each anchored around one of the engagement arms 46. The filter bag 36 is comprised of ends 64 having a generally triangular shape, and sides 66. Flaps 44 extend over into the interior of filter bag 36. Because the ends 64 of the filter bag are triangular in shape, the filter bag itself is tapered toward the bottom of the catch basin. Clearly, as run-off water flows into the interior of the filter bag 36, the material of the filter bag 36 allows water to pass through, while preventing silt and other particulate matter and debris from flowing through. Accordingly, the filtered water then flows out through sewer line 18.

Figure 7:
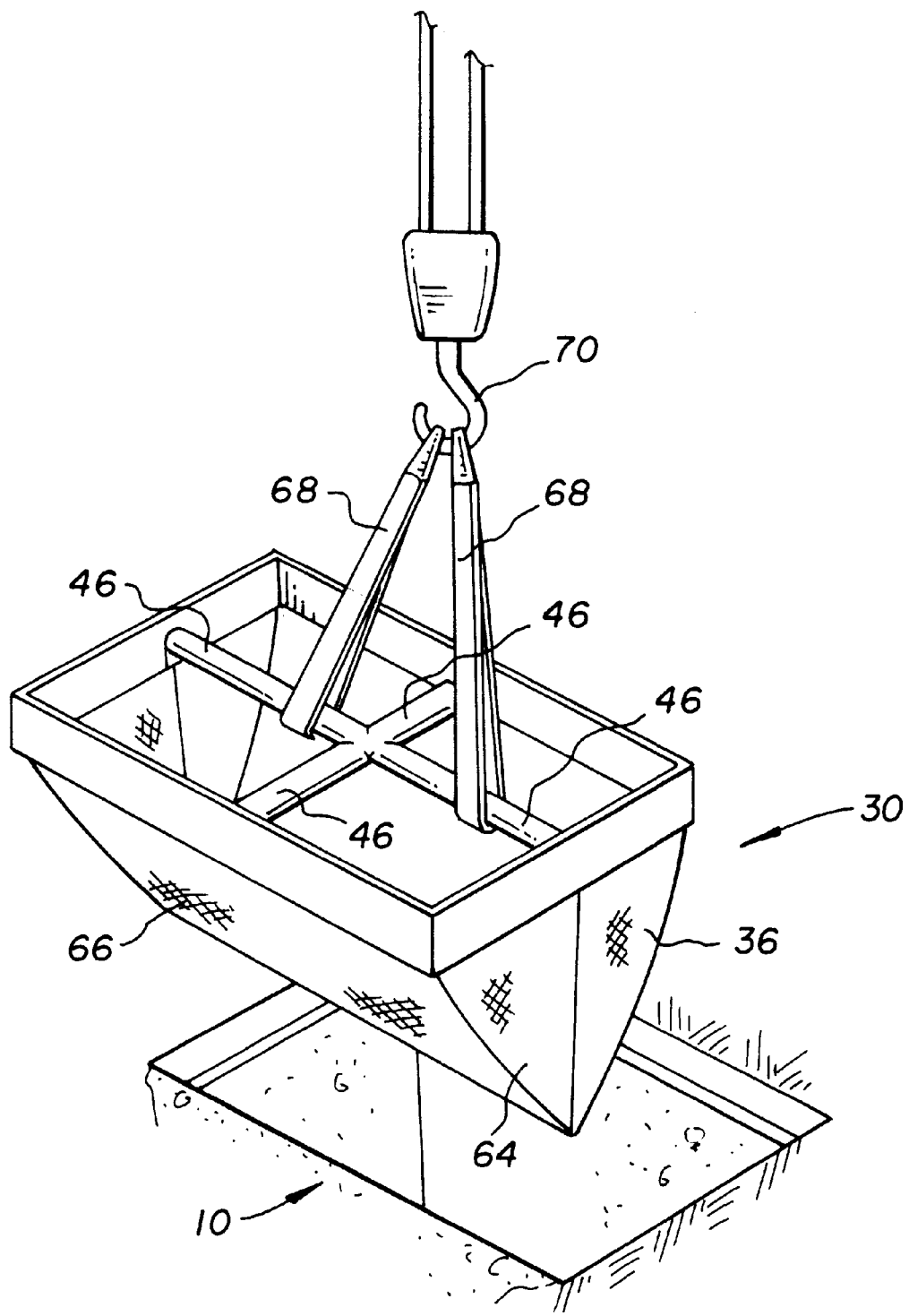
FIG. 7 illustrates the catch basin filter according to the instant invention, being inserted or removed from the catch basin itself.

FIG. 7 illustrates the catch basin filter 30 being inserted into or removed from catch basin 10. Straps 68, attached to hooks 70 of a crane (not shown) or other lifting device, are wrapped around two of engagement arms 46. The engagement arms 46 allow for easy lifting and thus easy insertion or removal of the catch basin filter 30 into or from its proper position in catch basin 10.

Figure 8:
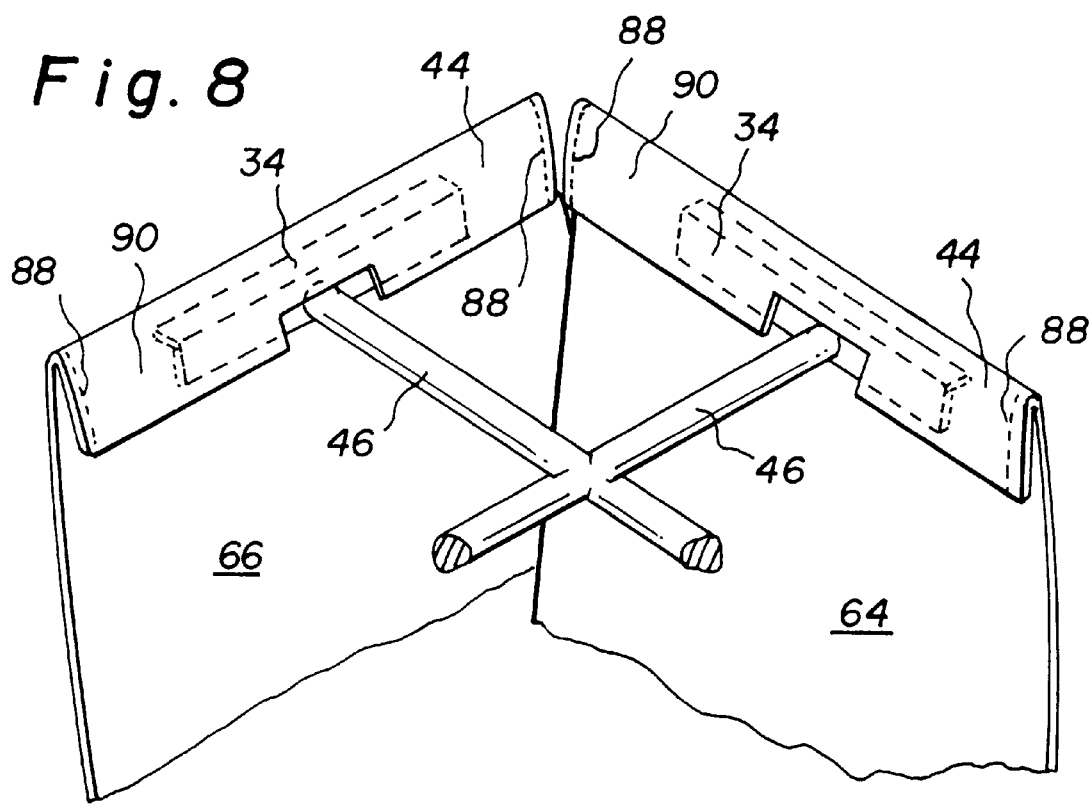
FIG. 8 is a cut-away view of a corner of the catch basin filter illustrating how the filter bag fits on the frame.

FIG. 8 is a partial cut-away view of a corner of the catch basin filter of FIGS. 3A and 3B. More specifically, FIG. 8 illustrates the preferred construction of flaps 44 of filter bag 36. FIG. 8 illustrates a side 66 and an adjoining end 64 of filter bag 36. Engagement arms 46 and edge pieces 34 support bag 36. Edge pieces 34 are shown in phantom since they are positioned underneath flaps 44.

Figure 9:
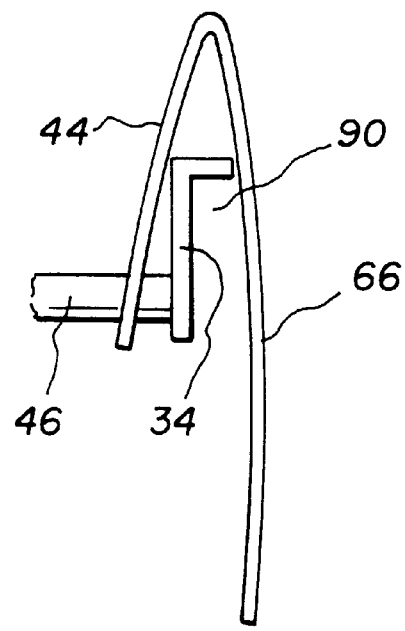
FIG. 9 is a cross-sectional view illustrating the relationship between an edge piece and the filter bag.

FIG. 9 is a cross-sectional view of an edge piece 34 in position between flap 44 and side 66 of the filter bag. As seen in FIGS. 8 and 9, each flap 44 is an extension of the side 66, or end 64, folded over and inwardly. FIG. 8 illustrates stitching 88 at the ends of each flaps to secure flap 44 of each side 66 (or end 64) of the filter bag 36, thus creating a pocket area 90 for accepting edge piece 34 therein.

Figure 10:
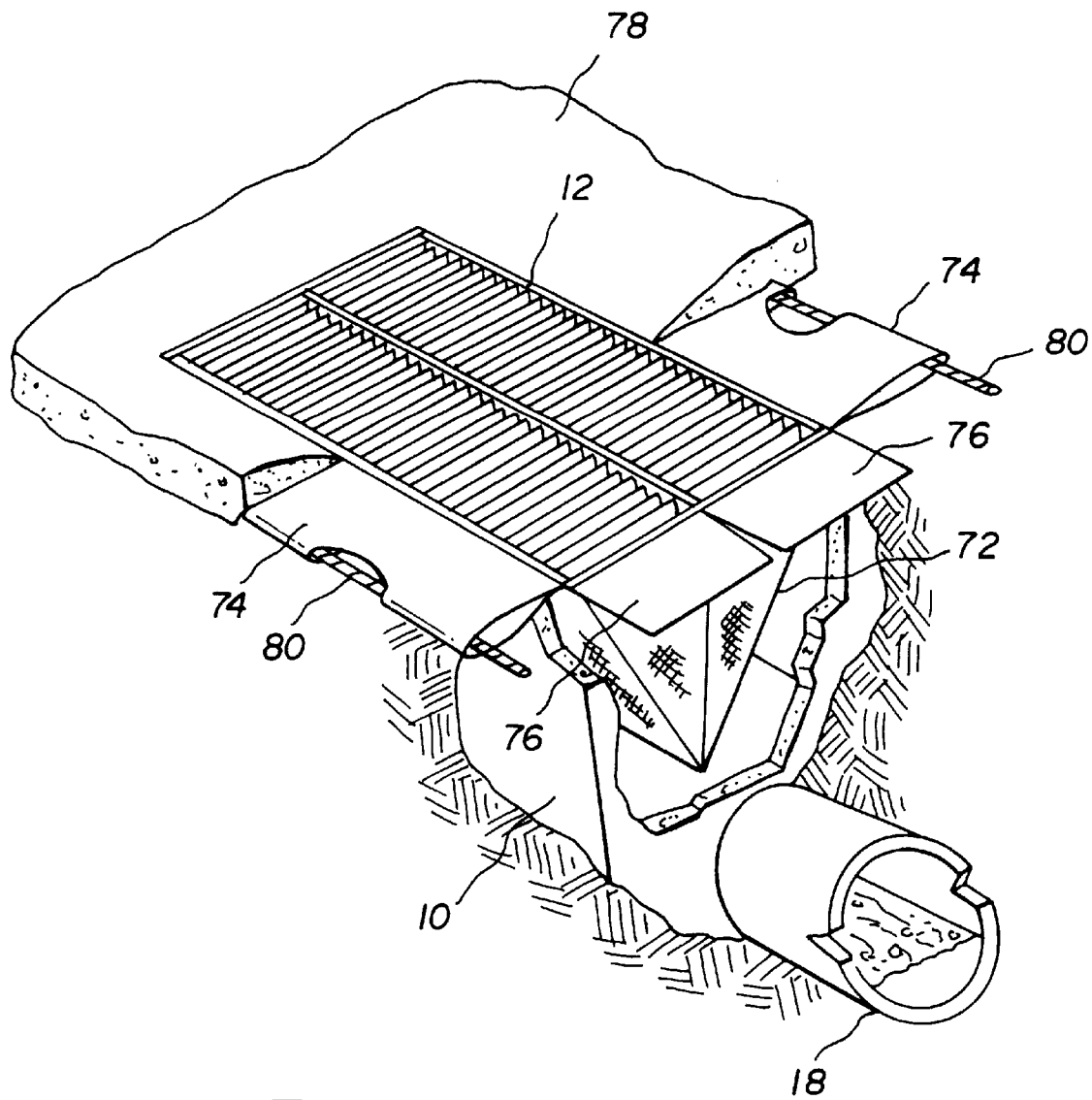
FIG. 10 is a perspective cut-away view of a conventional catch basin filter.

FIG. 10 shows a prior art device in which a catch basin 10 has an inlet grate 12 and outlet underground storm sewer line 18. A filter bag 72 is provided which has looped flaps 74 which extend outside of the catch basin, above grade. The looped flaps 74 and end flaps 76 are located above grade and are to be covered by earth 78. Bars 80 may be positioned inside of looped flaps 74 during operation or when the filter bag 72 is to be removed. Because the looped flaps (and bars 80) are located above grade, this arrangement is not a proper solution for areas in which snow plows and other street equipment are used to operate directly on the street surface.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A storm sewer catch basin filter, comprising:
 a frame;
 at least an edge piece fixed to said frame, said edge piece being cooperatively engageable with a lip in a storm sewer catch basin;
 a flexible filter bag folded over said edge piece and supported therefrom, wherein said filter bag has an open top for receiving water entering the storm sewer catch basin, the water being filtered as it passes through said filter bag.

2. The storm sewer catch basin filter of claim 1, wherein said frame includes a plurality of radially extending arms, each arm having an end, and further comprising a plurality of edge pieces, one of said edge pieces is fixed to said end of each arm.

3. The storm sewer catch basin filter of claim 2, wherein said frame includes four radially extending engagement arms.

4. The storm sewer catch basin filter of claim 3, wherein said four radially extending engagement arms are formed of two cross bars connected at a generally center point of each cross bar.

5. The storm sewer catch basin filter of claim 4, wherein one of said cross bars is longer than the other cross bar, thus allowing said cross bars to fit into a rectangular opening of storm sewer catch basin.

6. The storm sewer catch basin filter of claim 2, wherein said edge pieces are angle shaped, having a generally flat top portion and a generally vertical bottom portion extending downwardly from said top portion.

7. The storm sewer catch basin filter of claim 6, wherein said edge pieces are substantially straight and extend generally perpendicular and horizontally from said ends of said arms.

8. The storm sewer catch basin filter of claim 6, wherein said edge pieces are curved and extend generally horizontally from said ends of said arms.

9. The storm sewer catch basin filter of claim 6, wherein said frame includes four radially extending engagement arms.

10. The storm sewer catch basin filter of claim 9, wherein said four radially extending engagement arms are formed of two cross bars, joined together at a generally center point of each cross bar.

11. The storm sewer catch basin filter of claim 10, wherein one of said cross bars is longer than the other cross bar, thus allowing said cross bars to fit into a rectangular opening of the storm sewer catch basin.

12. The storm sewer catch basin filter of claim 6, wherein said frame includes three radially extending engagement arms each having said edge piece cooperatively engageable with a support ledge in the storm sewer catch basin, and a radially extending support arm having an edge support on an end thereof, such that said edge support also provides support for said filter bag.

13. The storm sewer catch basin filter of claim 12, wherein said three radially extending engagement arms and said radially extending support arm are formed of two cross bars, joined together at a generally center point of each cross bar.

14. The storm sewer catch basin filter of claim 13, wherein at least one of said edge pieces is fixed to said arm at a substantially midpoint of said edge piece.

15. The storm sewer catch basin filter of claim 13, wherein a plurality of said edge pieces are fixed to said arm at a point offset from a midpoint of said edge piece.

16. The storm sewer catch basin filter of claim 2, wherein at least one of said arms of said frame is adjustable in length.

17. The storm sewer catch basin filter of claim 16, wherein all of said arms are adjustable in length.

18. A storm sewer catch basin filter, comprising:
 a frame having four radial arms formed of two cross bars joined together at a generally center point of each cross bar;
 an edge piece is formed on an end of each arm, each edge piece having an angle shape with a generally flat top portion and a generally vertical bottom portion extending downwardly from said top portion, such that said angle shaped edge pieces engage a support ledge in the storm sewer basin to support said frame below a grating on top thereof;

a flexible filter bag having flaps folded over said edge pieces and supported therefrom, wherein said filter bag has an open top for receiving water entering the storm sewer, the water being filtered as it passes through said filter bag.

19. The storm sewer catch basin filter of claim 18, wherein said angle shaped edge pieces are generally straight.

20. The storm sewer catch basin filter of claim 18, wherein said angle shaped edge pieces are generally curved.

21. The storm sewer catch basin filter of claim 18, wherein said filter bag is tapered toward a bottom thereof.

22. The storm sewer catch basin filter of claim 21, further comprising a pair of dump straps secured to the bottom of said filter bag and extending upwardly through the interior of said filter bag.

23. The storm sewer catch basin filter of claim 20, wherein said filter bag has curved sides.

* * * * *